Sept. 10, 1963  C. J. GAHLINGER  3,103,193
METHOD OF AND APPARATUS FOR INFLATING LAMINATED SHEETS
Filed Sept. 29, 1960  2 Sheets-Sheet 1
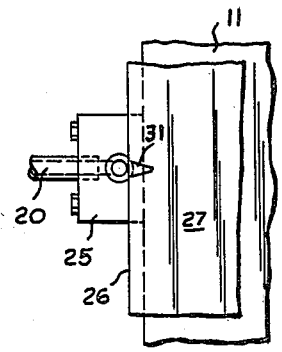
FIG. 1
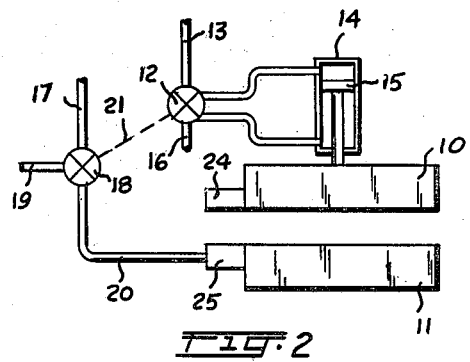
FIG. 2
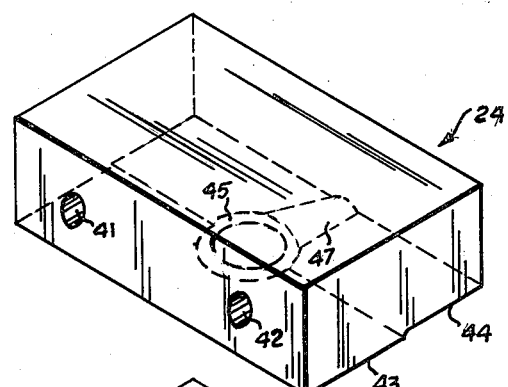
FIG. 4
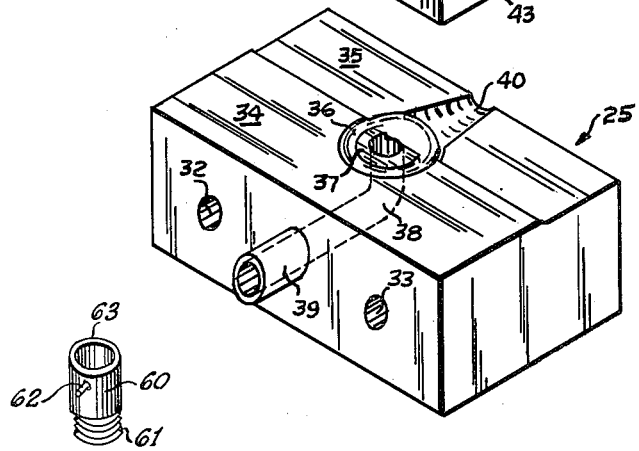
FIG. 3
FIG. 12
INVENTOR
CLARENCE J. GAHLINGER
BY *Glenn & Jackson*
ATTORNEYS

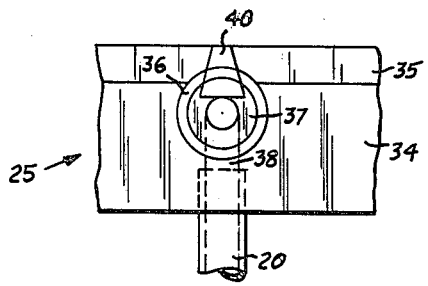
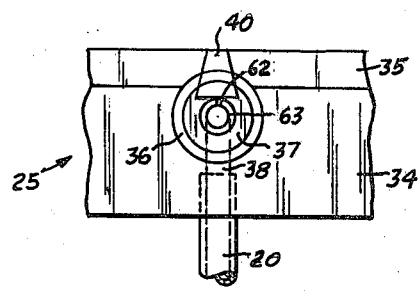
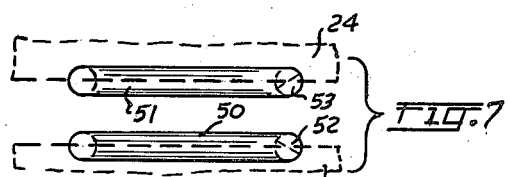
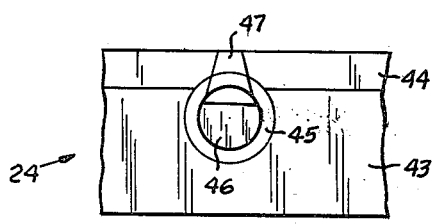
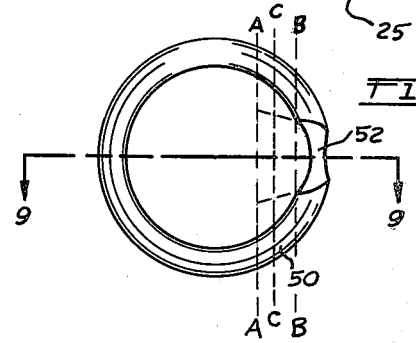
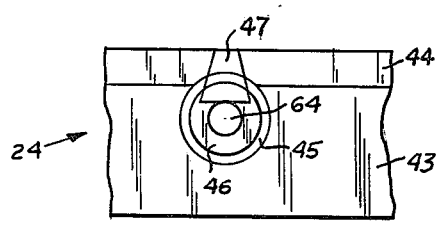
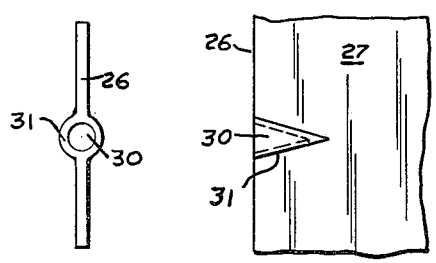

United States Patent Office 3,103,193
Patented Sept. 10, 1963

3,103,193
METHOD OF AND APPARATUS FOR INFLATING LAMINATED SHEETS
Clarence J. Gahlinger, Valley Station, Ky., assignor to Reynolds Metals Company, Richmond, Va., a corporation of Delaware
Filed Sept. 29, 1960, Ser. No. 59,262
9 Claims. (Cl. 113—44)

This invention relates to an improved method and apparatus for inflating laminated sheets or the like, the sheet being confined in a suitable press during its inflation.

In the manufacture of passageway panels formed of laminated metal sheet, aluminum being a particularly suitable metal for this purpose, numerous problems have been encountered which tend to reduce the rate of production of the inflated articles. For example, such panels usually include a laminated sheet construction having an intermediate weaker section or unbonded pattern, or the like, between the outer sheet surfaces and to which section or pattern an inflating fluid under high pressure is supplied in a controlled manner. At the time when this fluid is supplied, the panel is confined within a press structure cooperating with the panel so as to permit controlled expansion of that panel upon either of two sides, or upon both sides simultaneously. Heretofore, it has been the practice to employ a hollow inflation needle removably engageable with the confined edge of said panel during this expansion step and various forms of such needles have been developed for this purpose.

The use of such needles, however, imposes various limitations on the process and prevents a maximum rate of production from the large and expensive press structure which thus cannot be employed at its full capacity. For example, the operator, when using such needles is compelled to position the edge of the sheet carefully in alignment with that needle; the needle point may break or stick in the edge of the sheet when full inflating pressure is applied; leakage of inflating fluid may occur when the needle mechanism becomes worn; or the moving parts of the needle mechanism may malfunction.

It is these and similar disadvantages of the known methods and apparatus for inflating laminated sheets which it is a purpose of this invention to overcome.

An object of the present invention is to provide a simplified and efficient method for inflating laminated sheets.

Another object is to provide an improved apparatus for inflating laminated sheets having no parts which are movable during application of inflating pressure.

Another object is to provide an improved apparatus for inflating laminated sheets and in which all wear is confined to inexpensive, readily replaceable sealing members.

Other objects and advantages will become more apparent as the description proceeds and when considered in conjunction with the accompanying drawings in which:

FIG. 1 is a plan view showing a panel resting on the lower platen and lower inflating jaw portion of a press, and in the position occupied by the panel during inflation thereof.

FIG. 2 is a diagrammatic view illustrating one arrangement of valve control linking the operation of the press and inflating means of FIG. 1.

FIG. 3 is a perspective view of a lower inflating jaw embodying the present invention.

FIG. 4 is a perspective view of an upper inflating jaw embodying the present invention.

FIG. 5 is a plan view of a portion of one modification of the lower inflating jaw and with the lower sealing ring removed, the upper surface of the jaw being shown.

FIG. 5A is a plan view of a portion of a second modification of the lower inflating jaw and with the lower sealing ring removed, the upper surface of the jaw being shown.

FIG. 6 is a plan view of a portion of one modification of the upper inflating jaw cooperating with the lower jaw shown in FIG. 5 and with the lower surface of the upper inflating jaw being shown.

FIG. 6A is a plan view of a portion of a second modification of the upper inflating jaw cooperating with the lower jaw portion shown in FIG. 5A and with the lower surface of the upper inflating jaw being shown.

FIG. 7 is a side elevation to a larger scale of a preferred modification of the respective sealing rings shown diagrammatically as mounted in their respective inflating jaws and prior to engagement with a panel.

FIG. 8 is a plan view of a preferred modification of the lower sealing ring showing the upper surface thereof.

FIG. 9 is a sectional view taken on line 9—9 of FIG. 8.

FIG. 10 is a fragmentary plan view of one edge of a panel prepared for insertion into the press.

FIG. 11 is an end view of the edge of the panel shown in FIG. 10, and

FIG. 12 is a perspective view of the fluid directing ferrule used in the second modification of the inflating jaws.

In accordance with the invention, the inflation of the panel is carried out by first providing an opening at one edge thereof which leads into the inflatable interior of that panel and then by confining the panel edge between two ring-like sealing members having a space located inwardly of and defined by the inner walls of the members and communicating with the opening on the edge of the confined panel. After this confinement, the inflating fluid is supplied to that space and passes into the interior of the panel while the confining pressure is simultaneously being maintained upon the body of the panel and upon the sealing members holding the edge of that panel.

Referring now to FIGS. 1 and 2, any conventional inflating press having an upper platen 10 and a lower platen 11 may be employed with the invention. It will be understood that such platens are adapted to confine the inflatable sheet or panel in such manner as to permit expansion thereof in selected areas of such sheet or panel thereby to form a final product which is expanded on either side or on both sides, all as known in the prior art. Moreover, as is also known, a platen of the press, here shown as upper platen 10, is suitably actuated by controlled movement of a valve, such as four-way valve 12, so as to direct a high pressure fluid from a supply line 13 to either end of a cylinder 14 having a piston 15 therein, movement of that piston being translated into movement of the upper platen. The cylinder is vented by the valve 12 into a low pressure return line 16.

Also, as is known and as shown in the copending application of Clarence J. Gahlinger, Serial No. 830,819, filed July 31, 1959, now U.S. Patent 3,053,211, a separate inflation fluid system which, for example, may be a high pressure water system, is used, and may conveniently include a supply line 17 controlled by a three-way valve 18 from which extends a low pressure return line 19. The connecting line from this valve through which fluid may pass to and from the inflating jaws of the present structure is indicated at 20. Valve 18 may be operated automatically in conjunction with the operation of valve 12 employing any conventional linkage arrangement as indicated generally by dotted line 21. That is, when valve 12 is shifted under control of the operator of the press, valve 18 is subsequently shifted in dependence upon the movement of valve 18 and following confinement of the sheet between the platens and sealing members later to be described. Many forms of such interlocking valve movements are known, such as hydraulic, mechanical and electrical types and thus being conventional require no illustration. It will, however, be further understood that, in its broader aspects, the invention is not limited to the interlocked control since, if desired, valve 18 may be operated independently of valve 12.

As seen in FIG. 2, a corresponding edge of each of platens 10 and 11 has rigidly mounted thereon inflation jaws 24 and 25, respectively, and adapted for confinement therebetween of one edge 26 of a sheet 27 in the manner now to be described. As noted in FIG. 1, this edge of the sheet, which may be of aluminum having an uninflated thickness of about 0.060 inch, extends outboard of the platens when inflation thereof is to take place.

The edge 26 of the sheet, moreover, is provided with an opening 30 leading into the aforementioned interior unbonded pattern or weaker section of the laminated sheet and may conveniently be of a generally conical shape having a bulged-out wall 31 as seen in FIG. 11.

Considering now FIGS. 3 and 5, the lower inflating jaw 25 preferably is formed of a solid metal block of steel or the like and of comparatively small dimensions, for example, about 8 inches long, 2 inches wide and 2 inches high. By means of massive blocks insertable through holes 32 and 33 therein, the block is mounted rigidly against the side face of lower platen 11. The upper face of the jaw comprises a flat surface 34 extending longitudinally and an adjacent undercut flat surface 35 also extending longitudinally and being undercut to a suitable dimension, for example 0.030 inch. Centrally located in the upper face is a recess, 36, preferably having the configuration of the lower half of a torus and intersecting both surfaces 34 and 35. Centrally located within the torus is a third flat surface 37 forming a floor adapted to be flooded with inflating fluid supplied to the block through a passageway 38 connected to conduit 20 as by means of a coupling 39 threaded into the side of said block. Preferably, the surface of floor 37 and the jaw surface 34 lie in the same plane. Extending from the edge of floor 37 to the edge of jaw 25, which abuts against the platen 11, is a suitable channel 40 having a configuration large enough to receive the lower portion of the bulged-out wall 31 of the sheet to be inflated.

For cooperation with the described lower jaw, the corresponding upper jaw 24 comprises a block of metal through which holes 41 and 42 extend for receiving massive bolts attaching the upper jaw to the edge of the upper platen 10. As seen in FIG. 6, the lower face of this jaw comprises a flat surface 43 extending longitudinally and an adjacent flat surface 44 also extending longitudinally and being undercut to a suitable dimension, for example, 0.030 inch. Centrally located in the lower face of the upper jaw is a recess 45 preferably having the configuration of the upper half of a torus and intersecting both surfaces 43 and 44. Centrally located within this torus is a third flat surface 46 forming a roof adapted to be flooded with inflating fluid during the inflation of the sheet. Preferably, the surface of roof 46 and the jaw surface 43 lie in the same plane. Extending from the edge of roof 46 to the edge of jaw 24 which abuts against the upper platen 10 is a suitable channel 47 having a configuration large enough to receive the upper portion of the bulged-out wall 31 of the sheet to be inflated.

It will be appreciated that the surface 43 of the upper jaw does not come into contact with the surface 34 of the lower jaw when the press platens are fully closed, remaining slightly separated from each other at a predetermined distance which in turn is predetermined by the nature of the sheet being inflated, the type of sealing means used, and similar factors. Accordingly, any conventional means, not shown, for shimming one or the other of the jaws in its mounting on the respective platens, may be used. Preferably, such shimming means is applied to the jaw which is attached to the movable platen, such as jaw 24, rather than the stationary jaw, since the latter has the high pressure inflating fluid line attached to it.

For use with the above-described structure, a pair of simple resilient O-rings are employed as the sealing means and may be of the type seen in FIGS. 7 to 9. These rings may be formed of any suitable resilient material, neoprene rubber having been used successfully. Lower ring 50 is of a configuration fitting snugly within the recess 36 of the lower jaw and upper ring 51 is likewise of a configuration fitting snugly within the recess 45 of the upper jaw, the rings being of substantially the same diameter.

Lower ring 50, however, at its peripheral edge, is provided with a partially cutaway section 52 communicating the hollow space within that ring with the space within channel 40 of the lower jaw when that ring is in its operative position in recess 36. Similarly, upper ring 51 is provided with a partially cut away space 53 communicating the hollow space within that ring with the space within channel 47 when that ring is in its operative position in recess 45. Preferably, these cut-away portions are identical so that a given ring may be used interchangeably as a lower or upper ring. The cut-away portions also are so shaped as to receive with a snug fit the bulged-out wall 31 of the sheet when inflation of that sheet is to occur.

With the foregoing in mind, the process of the invention will now be evident. Having at hand a sheet with its edge 26 provided with the opening 30 within the bulged-out wall 31, the operator arranges that edge 26 so as to lie somewhere between the lines indicated generally at A—A and B—B in FIG. 8 with respect to the lower ring 50 when that ring is emplaced in the lower jaw. Preferably, the edge 26 may lie along line C—C corresponding to the location of the edges of undercut surfaces 35 and 44.

The platen 10 is then moved into its closed position with respect to platen 11 and as this occurs the upper jaw 24 approaches lower jaw 25 and the two sealing rings deform in contact with each other and squeeze against the wall 31 of the opening into the sheet. Thereafter, operation of valve 18 permits inflating fluid at high pressure to enter into the space defined by floor 37 of the lower jaw, roof 46 of the upper jaw, and the circumferential wall formed by the tightly compressed rings, and to flow from that space into opening 30 in the confined sheet. After the sheet is suitably inflated, valve 18 operates to release this pressure fluid, after which valve 12 is operated to retract the upper platen. Promptly thereafter the operator pushes the inflated sheet from between the platens and inserts a new sheet on which the same operation is carried out.

As will be seen, the operator is not compelled to adjust the edge 26 of the sheet precisely with respect to the edge of the undercut portions of the jaws and thus a time-consuming operation is eliminated. So long as the edge of opening 30 lies inwardly of the cut-away portions of the rings, as at line B—B, the process is operable and due to the space between channels 40 and 47, the closing of the jaws will not completely close the opening 30 of the sheet. At the other extreme, if the edge 26 lies inwardly sufficiently far to be pinched between surfaces 34 and 43 as the jaws close, corresponding to edge 26 being located at line A—A of FIG. 8, the process still is operable since the channels 40 and 47 receiving the opening 30 of the sheet extend considerably farther inwardly of the jaws than do the edges of the undercut portions 35 and 44. It will be understood that the aluminum material comprising the sheet may be pinched and reduced in thickness at the edge of the sheet without damage to the panel being manufactured since that edge portion of the panel is normally to be trimmed after its inflation in the press.

When the sealing rings finally become fatigued or worn, they may be readily removed and replaced with new rings, and being of inexpensive material are economically expendible in view of the savings in press time which they afford. Moreover, since no moving parts are employed in this arrangement, as contrasted with the inflation needles heretofore used, no damage to the sheet is possible by contact of such rings therewith.

Various modifications of the apparatus used for carrying out the process of the invention may be employed. For example, when it is desired to effect a directed jet of the inflating fluid into the opening 30 of the sheet the arrangement of FIGS. 5A and 6A may be used. As in the earlier described modifications, the lower jaw 25 comprises the surfaces 34 and 35, floor 37, and the recess 36 and channel 40. However, the opening from passageway 38 is made large enough to contain the ferrule as seen in FIG. 12. This ferrule is of cylindrical form, open at each end, and has a wall 60 threaded at its lower end 61 for engagement within the lower jaw. In one side of the ferrule a fluid-jet-directing aperture 62 is provided and as best seen in FIG. 5A this aperture is at a suitable height and direction to face into the axis of the opening 30 within the sheet to be inflated. The upper end 63 of the ferrule extends above the upper surfaces 34 and 37 of the lower jaw.

In this modification, the upper jaw 24 also comprises the surfaces 43 and 44, roof 46, and the recess 45 and channel 47. However, an additional recess 64 is provided within the roof 46 having a sufficient depth to receive the extreme upper end 63 of the ferrule when the jaws reach their fully closed positions.

It will be appreciated that in carrying out the process with this modification of apparatus the same procedural steps are employed. However, as the inflating fluid under high pressure enters the ferrule, it immediately jets toward the opening in the edge of the sheet even while it is filling the confined space between the floor 37, roof 46, and the circumferential wall formed by the tightly compressed rings. The application of this jet of pressure fluid appears to be beneficial in starting the inflating of the panel and in reducing wear on the rings.

Whereas the preferred form of sealing rings employs a cut-away portion of the ring itself as a means of communicating the interior of the ring with the edge of the sheet, it will be understood that this is not essential and that other equivalent arrangements may be used. For example, rings of greater flexibility may be employed without cutting away such ring portions and by providing instead deeper portions of the recesses 36 and 45 in the respective jaw portions at the locations where the respective channels 40 and 47 join those recesses. In such an arrangement a portion of the peripheral edges of the rings themselves are deformed into those deeper portions of the recesses when pressure fluid enters the interior of the rings and the deformation of the rings at those locations separates a part of the rings from each other and permits the fluid communication into the edge of the confined sheet.

Having thus described the invention, it will be obvious to those skilled in the art that various changes and modifications may be made therein without departing from the true spirit and scope thereof and it is intended therefore, in the appended claims to cover all such equivalent variations and modifications.

What is claimed is:

1. In a method of inflating a laminated sheet having an opening at one edge thereof leading into the inflatable interior of the body of said sheet the steps comprising, confining said one edge of said sheet between jaws having two ring-like resilient sealing members each having a peripheral edge portion adapted to communicate the space located inwardly of and defined by the jaws and inner walls of said members with the opening at said edge of the confined sheet, forcing an inflating fluid under pressure from said space into the opening at said edge of said sheet and simultaneously maintaining the confinement of said one edge of said sheet between said sealing members while forcing said fluid into said sheet.

2. A method of inflating a laminated sheet having an opening at one edge thereof leading into the inflatable interior of the body of said sheet comprising, confining the body of said sheet between the platens of a press, applying a holding pressure to said platens sufficient to limit the extent of inflation of the body of said sheet, confining said one edge of said sheet between jaws having two ring-like resilient sealing members each having a peripheral edge portion adapted to communicate the space located inwardly of and defined by the jaws and inner walls of said members with the opening at said edge of said sheet, forcing an inflating fluid under pressure from said space into the opening at said edge of said sheet, and simultaneously maintaining the confinement of said body of said sheet between said platens and the confinement of said one edge of said sheet between said sealing members while forcing said inflating fluid into said sheet.

3. In combination, a press having first and second relatively movable platens for releasably confining therebetween a laminated sheet having an opening at one edge thereof leading into the inflatable interior of said sheet, platen actuating means for moving at least one of said platens toward and from the other platen, a first inflating jaw portion rigidly attached to the edge of said first platen, a second inflating jaw portion rigidly attached to the corresponding edge of said second platen, said jaw portions being adapted to confine therebetween said one edge of said sheet, each of said jaw portions having a recess confronting the recess in the other jaw portion, a ring-like sealing means in each of said recesses having a peripheral edge portion adapted to communicate with the opening in the confined edge of said sheet and with the space located inwardly of and defined by the inner walls of said sealing means, said sealing means being adapted to seal against each other and against the confined edge of said sheet when said jaw portions approach each other and means for supplying inflating fluid under pressure to said space during sealed contact of said sealing means with each other and with said edge of said sheet.

4. An apparatus as defined in claim 3 wherein said sealing means comprises a pair of resilient O-rings and said recesses comprise respectively upper and lower portions of torus-like spaces.

5. In combination, a press having first and second relatively movable platens for releasably confining therebetween a laminated sheet having an opening at one edge thereof leading into the inflatable interior of said sheet and defined by a bulged-out wall section, platen actuating means for moving at least one of said platens toward and from the other platen, a first inflating jaw portion rigidly attached to the edge of said first platen, a second inflating jaw portion rigidly attached to the corresponding edge of said second platen, said jaw portions being adapted to confine therebetween said one edge of said sheet, each of said jaw portions having a recess confronting the recess in the other jaw portion and channels leading from the respective recesses to the edge of the respective jaw portions adjacent said platens, a ring-like sealing means in each of said recesses having a peripheral edge portion adapted to communicate with the opening in the confined edge of said sheet and with the space located inwardly of and defined by the inner walls of said sealing means, said wall of said sheet opening being received in said channels and said sealing means being adapted to seal against each other and against the confined edge of said sheet when said jaw portions approach each other, and means for supplying inflating fluid under pressure to said space during sealed contact of said sealing means with each other and with said edge of said sheet.

6. An apparatus as defined in claim 5 wherein said channels extend inwardly of said recesses thereby to permit variation in the positioning of said edge of said sheet within said jaw portions.

7. For use in the inflating of a laminated sheet having an opening at one edge thereof leading into the inflatable interior of said sheet and defined by a bulged-out wall section, an upper and a lower inflating jaw adapted selectively to confine said edge of said sheet therebetween and to release said edge from confinement, means for moving at least one of said jaws toward and from the other jaw, said lower jaw having an upper surface including a recess in the general form of the lower portion of a torus, a floor portion within said torus and a channel extending from an edge of said lower jaw and terminating at said floor portion inwardly of said recess, said upper jaw having a lower surface including a second recess in the general form of the upper portion of a second torus, a roof portion within said second torus, and a second channel extending from an edge of said upper jaw and terminating at said roof portion inwardly of said second recess, a resilient O-ring in each of said recesses, each O-ring having an opening through the wall thereof for communicating with the opening in the confined edge of said sheet, and an opening in said floor portion of said lower jaw connected to a supply of inflating fluid under pressure, said channels being arranged to contain therein the bulged-out wall of said edge of said sheet during supply of fluid to said jaws.

8. Apparatus as defined in claim 7 wherein said roof portion of said upper jaw lies in a single plane.

9. Apparatus as defined in claim 7 wherein said roof portion of said upper jaw includes a cup-shaped hole and said lower jaw mounts a hollow projection extendible into said hole as said jaws approach each other, said hollow projection being connected to said supply of inflating fluid and having a lateral opening for directing fluid toward said opening in the confined edge of said sheet.

References Cited in the file of this patent
UNITED STATES PATENTS

| | | |
|---|---|---|
| 2,866,429 | Staples | Dec. 30, 1958 |
| 2,966,730 | Thomas | Jan. 3, 1961 |